United States Patent
Jeon (10) Patent No.: US 8,984,180 B2
(45) Date of Patent: Mar. 17, 2015

(54) RELAY AND DATA PROCESSING METHOD

(75) Inventor: Byung Joon Jeon, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/609,109

(22) Filed: Sep. 10, 2012

(65) Prior Publication Data

US 2013/0067251 A1 Mar. 14, 2013

(30) Foreign Application Priority Data

Sep. 9, 2011 (KR) ........................ 10-2011-0091877

(51) Int. Cl.
| | | |
|---|---|---|
| *G06F 13/00* | (2006.01) | |
| *G06F 3/00* | (2006.01) | |
| *G06F 15/173* | (2006.01) | |
| *H02H 3/00* | (2006.01) | |
| *H02H 1/00* | (2006.01) | |
| *H02H 7/08* | (2006.01) | |
| *H01H 47/00* | (2006.01) | |

(52) U.S. Cl.
CPC .............. *H02H 3/00* (2013.01); *Y02B 70/3216* (2013.01); *Y04S 20/221* (2013.01); *H02H 1/0061* (2013.01); *H02H 7/08* (2013.01); *H01H 47/002* (2013.01)
USPC .................. 710/33; 710/17; 710/52; 709/217; 709/223; 709/224

(58) Field of Classification Search
None
See application file for complete search history.

(56) References Cited

U.S. PATENT DOCUMENTS

| 6,005,759 | A | * | 12/1999 | Hart et al. ........................ 361/66 |
| 6,792,337 | B2 | * | 9/2004 | Blackett et al. ............... 700/295 |
| 7,184,904 | B2 | * | 2/2007 | Kagan .............................. 702/62 |
| 7,274,332 | B1 | * | 9/2007 | Dupray ......................... 342/450 |
| 7,376,710 | B1 | * | 5/2008 | Cromwell et al. ............. 709/219 |
| 7,616,656 | B2 | * | 11/2009 | Wang et al. .................... 370/463 |
| 7,813,822 | B1 | * | 10/2010 | Hoffberg ........................ 700/94 |
| 7,930,141 | B2 | * | 4/2011 | Banting ........................ 702/183 |
| 7,945,401 | B2 | * | 5/2011 | Bowdry et al. ................. 702/60 |
| 8,160,824 | B2 | * | 4/2012 | Spanier et al. .................. 702/57 |
| 8,208,534 | B2 | * | 6/2012 | Kreiner et al. ........... 375/240.01 |
| 8,490,128 | B2 | * | 7/2013 | Davis et al. ..................... 725/32 |
| 2004/0059811 | A1 | * | 3/2004 | Sugauchi et al. ............. 709/224 |
| 2007/0003023 | A1 | * | 1/2007 | Rolia et al. ................. 379/32.01 |

(Continued)

FOREIGN PATENT DOCUMENTS

JP 2008-028863 2/2008

OTHER PUBLICATIONS

The State Intellectual Property Office of the People's Republic of China Application Serial No. 201210327330.2, Office Action dated Jun. 4, 2014, 10 pages.

*Primary Examiner* — Michael Sun
(74) *Attorney, Agent, or Firm* — Lee, Hong, Degerman, Kang & Waimey (57) ABSTRACT

A relay and a data processing method are provided. The relay includes: a detection unit for classifying and detecting event oriented monitoring data and non-event oriented monitoring data from monitoring data; a storage unit for storing the detected monitoring data; a communication unit for receiving a request signal of the monitoring data from a monitoring device and transmitting corresponding monitoring data in response to a transmission request signal of the monitoring data; and a control unit for extracting event oriented monitoring data from the monitoring data and performing a control to transmit the monitoring data requested from the monitoring device.

8 Claims, 5 Drawing Sheets

(56) References Cited

U.S. PATENT DOCUMENTS

| | | | |
|---|---|---|---|
| 2008/0170508 A1* | 7/2008 | Popiak et al. | 370/252 |
| 2008/0312851 A1* | 12/2008 | Kagan et al. | 702/60 |
| 2009/0228919 A1* | 9/2009 | Zott et al. | 725/34 |
| 2009/0254655 A1* | 10/2009 | Kidwell et al. | 709/224 |
| 2011/0282508 A1* | 11/2011 | Goutard et al. | 700/293 |
| 2012/0084400 A1* | 4/2012 | Almadi et al. | 709/219 |
| 2012/0158960 A1* | 6/2012 | Upham et al. | 709/224 |
| 2013/0332773 A1* | 12/2013 | Yuan et al. | 714/26 |

* cited by examiner

| ITEM | INDEX | DESCRIPTION |
|---|---|---|
| CONTACT POINT STATE | 0 | CONTACT POINT INPUT 1 STATE |
| | 1 | CONTACT POINT INPUT 2 STATE |
| | 2 | CONTACT POINT OUTPUT 1 STATE |
| | ... | |
| SETTING VALUE | 0 | OVER-CURRENT FACTOR USAGE |
| | 1 | OVER-CURRENT FACTOR CRITICAL VALUE |
| | 2 | OVER-CURRENT FACTOR OPERATING TIME VALUE |
| | ... | |

| | 0 | R PHASE VOLTAGE VALUE |
|---|---|---|
| ELECTRICITY AMOUNT | 1 | S PHASE VOLTAGE VALUE |
| | 2 | T PHASE VOTLAGE VALUE |
| | ... | |

RELAY AND DATA PROCESSING METHOD

CROSS-REFERENCE TO RELATED APPLICATIONS

Pursuant to 35 U.S.C. §119(a) and 35 U.S.C. §365, this application claims the benefit of earlier filing date and right of priority to Korean Patent Application No. 10-2011-0091877, filed on Sep. 9, 2011, the contents of which are hereby incorporated by reference herein in its entirety.

BACKGROUND

The present disclosure relates to a method of processing data of a relay, and a relay for the same, and more particularly, to a method of processing data of a relay, which collects and stores monitoring data in an efficient way when there is a request on monitoring data from a monitoring device in a remote place, and transmits the monitoring data to the monitoring device in response to a request, and a relay for the same.

A protective relay is a device having a command function for cutting a corresponding portion from an electrical circuit when an abnormal state such as a short circuit or eddy current occurs in the electrical circuit. There are various kinds of protective relays. For example, protective relays include an under-voltage relay for operating when a circuit voltage drops, a temperature relay for detecting a critical temperature, a differential relay for operating when a ratio of primary and secondary currents in a transformer is abnormal, and a ground relay for notifying a ground incident of a power transmission line.

SUMMARY

Embodiments provide a data processing method for collecting data on the basis of an item value of a point where an event occurs in order to collect information and achieve delivery efficiency according to an increase of a point list transmitted from a relay.

Additionally, example embodiments of the present invention provide a data processing method in order to transmit data on the basis of a point where an event occurs when there is a data request from a monitoring device.

In one example embodiment, a relay includes: a detection unit for classifying and detecting event oriented monitoring data and non-event oriented monitoring data from monitoring data; a storage unit for storing the detected monitoring data; a communication unit for receiving a request signal of the monitoring data from a monitoring device and transmitting corresponding monitoring data in response to a transmission request signal of the monitoring data; and a control unit for extracting event oriented monitoring data from the monitoring data and performing a control to transmit the monitoring data requested from the monitoring device.

The detection unit may detect event oriented monitoring data first when detecting monitoring data.

The control unit may check a type of the monitoring data requested from the monitoring device, and may perform a control to extract data corresponding to the type of the checked monitoring data from the storage unit in order to transmit the extracted data.

The control unit may store the detected setting value data and the detected monitoring data in a corresponding point in a point list defined by Distributed Network Protocol (DNP).

When the detection unit detects event oriented monitoring data, the event oriented monitoring data may be stored in a point corresponding to the detected event oriented monitoring data.

The transmission request signal of the monitoring data may include at least one of event oriented monitoring data or monitoring data of a specific index, and the control unit may check the transmission request signal, and may transmit corresponding monitoring data to the monitoring device.

In another example embodiment of the present invention, a monitoring data processing method of a relay includes: detecting user setting value data; storing the detected setting value data; checking a communication state with respect to a monitoring device that requests the monitoring data; detecting event oriented monitoring data from the monitoring data; storing the detected monitoring data; receiving a transmission request signal of monitoring data from the monitoring device; and transmitting the monitoring data in response to the transmission request signal of the monitoring data.

The method may further include storing the detected setting value data and the detected monitoring data in a corresponding point in a point list defined by Distributed Network Protocol (DNP).

The detecting of the monitoring data may include detecting at least one of event oriented monitoring data and non-event monitoring data.

When the event oriented monitoring data are detected, the method may further include storing the event oriented monitoring data in a point corresponding to the detected event oriented monitoring data.

The method may further include transmitting monitoring data in response to the transmission request signal, wherein the transmission request signal of the monitoring data includes at least one of event oriented monitoring data and monitoring data of a specific index.

When a monitoring data transmission request is transmitted from the monitoring device, the method may further include: checking a type of the requested monitoring data; and transmitting corresponding monitoring data to the monitoring device according to the checked type.

The details of one or more embodiments are set forth in the accompanying drawings and the description below. Other features will be apparent from the description and drawings, and from the claims.

DETAILED DESCRIPTION OF THE EMBODIMENTS

The terms and words used in the specification and claims should not be interpreted as conventional or dictionary meanings, and thus, should be interpreted as meanings and concepts corresponding to the technical idea of the present invention, on the basis of the principle that the inventor may appropriately define the concept of the terms in the best way in order to describe his/her own invention.

Accordingly, the example embodiments of the present invention may, however, be embodied in many different forms and should not be construed as being limited to the example embodiments of the present invention set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
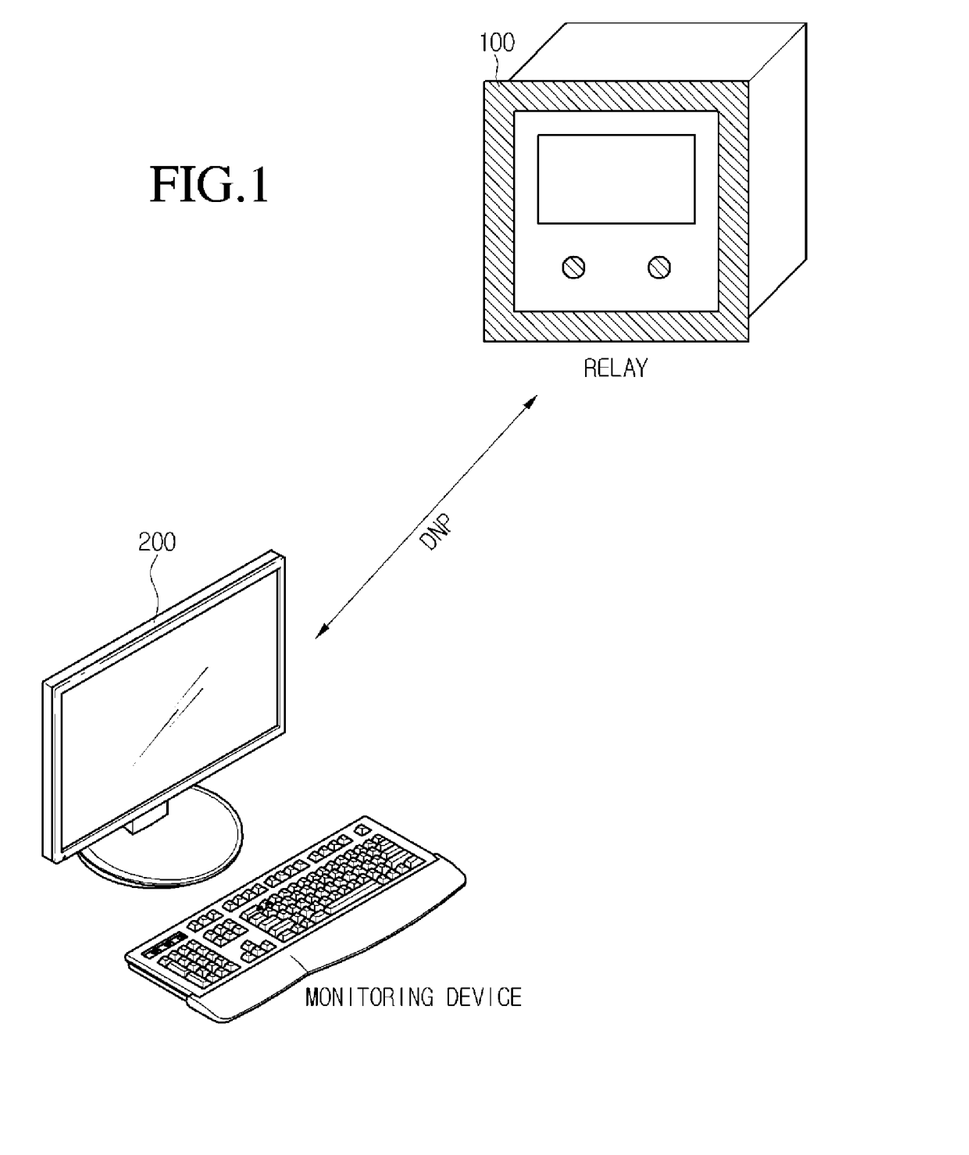
FIG. 1 is a view illustrating a communication connection system configuration of a monitoring device and a relay.

FIG. 1 is a view illustrating a communication connection system configuration of a monitoring device and a relay.

Referring to FIG. 1, the relay 100 may be connected to the monitoring device 200 through a DNP communication method. The relay 100 may receive a monitoring data request signal from the monitoring device 200. The relay 100 may transmit the monitoring data, which are collected according to a request of the monitoring device 200, to the corresponding monitoring device 200.

The monitoring device 200 operates as a master and the relay 100 operates as an outstation, so that necessary data may be obtained.

Figure 2:
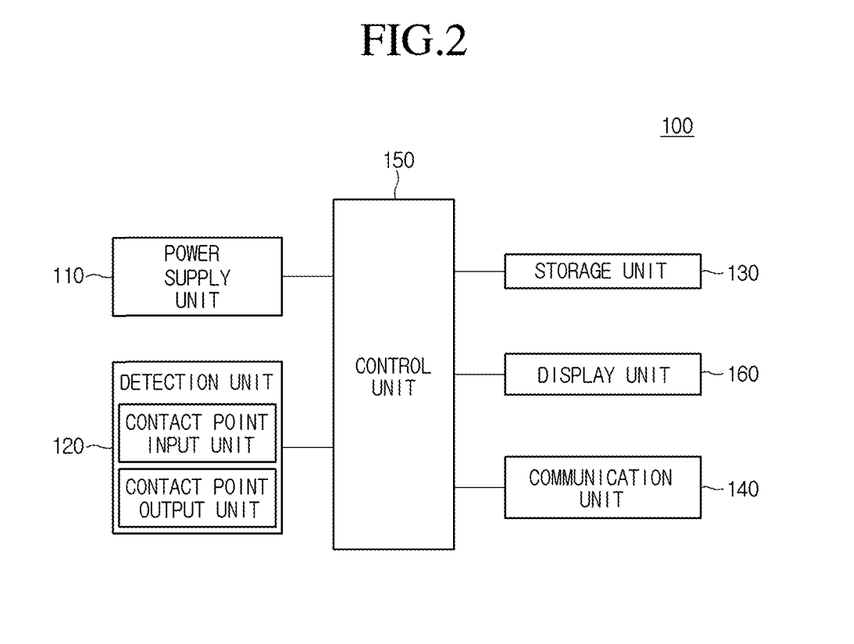
FIG. 2 is a block diagram of a relay according to an example embodiment of the present invention.

FIG. 2 is a block diagram of a relay according to an embodiment of the present invention.

Referring to FIG. 2, the relay 100 may include a power supply unit 110, a detection unit 120, a storage unit 130, a communication unit 140, a control unit 150, and a display unit 160.

The power supply unit 110 may supply DC power to various kinds of components constituting the relay 100. For example, the power supply unit 110 may include a transformer for converting a commercial AC power of 220 V into a DC power of 5 V and a diode rectifier circuit.

The detection unit 120 may detect/receive monitoring data. When the monitoring data are contact point state data, the detection unit 20 may include a contact point input unit (not shown) and a contact point output unit (not shown). Additionally, when the monitoring data are electricity amount data, the detection unit 120 may include a detection current input unit (not shown) and a detection voltage input unit (not shown) in order to receive each phase current value of three-phase power supply line of the power supplied to a motor (not shown).

Additionally, the detection unit 120 may further include a current transformer for detecting each phase current value. Moreover, when setting value data are monitoring data, the detection unit 120 may further include a user interface unit (not shown).

The storage unit 130 may store monitoring data detected according to an embodiment of the present invention or may update pre-stored monitoring data with newly-inputted data. The storage unit 130 may include HDD, EEPROM, and Flash Memory.

The storage unit 130 may store monitoring data detected according to an example embodiment of the present invention or may update pre-stored monitoring data with newly-inputted data. The communication unit 140 may include a communication module for receiving a monitoring data request signal or transmitting the requested monitoring data to the monitoring device 200.

The communication unit 140 may include a communication module for transmitting DNP type data through a TCP/IP method according to an example embodiment of the present invention.

The control unit 150 may process various kinds of data in order to control the power supply of the relay 100 or the input/output signals to an external device. For example, the control unit 150 may determine the failure of a motor and a failure factor on the basis of a current value or input data received from the detection unit 120. The control unit 150 generates a control signal to stop the power supply of a motor when the motor is failed. Then, the control signal may be outputted to a contact point output unit (not shown) and a failure factor may be displayed on the display unit 160.

Additionally, the control unit 150 compares the data inputted from the detection unit 120 with a reference value in order to determine whether the over-current, phase loss, inter-phase inequity, reverse phase, and grounding occur and control the failure data according thereto to be stored in the storage unit 130.

The control unit 150 may detect setting value data from the monitoring data first and may store them. The control unit 150 may control the detected setting value data and the detected monitoring data to be stored in a corresponding point of a point list defined by a DNP method.

The display unit 160 displays input terminal information or output terminal information so that a user may confirm the information. The display unit 160 may display a failure factor or state of a motor in addition to the above information. The display unit 160 may include a light emitting diode, a liquid crystal display, and a lamp.

Figure 3:
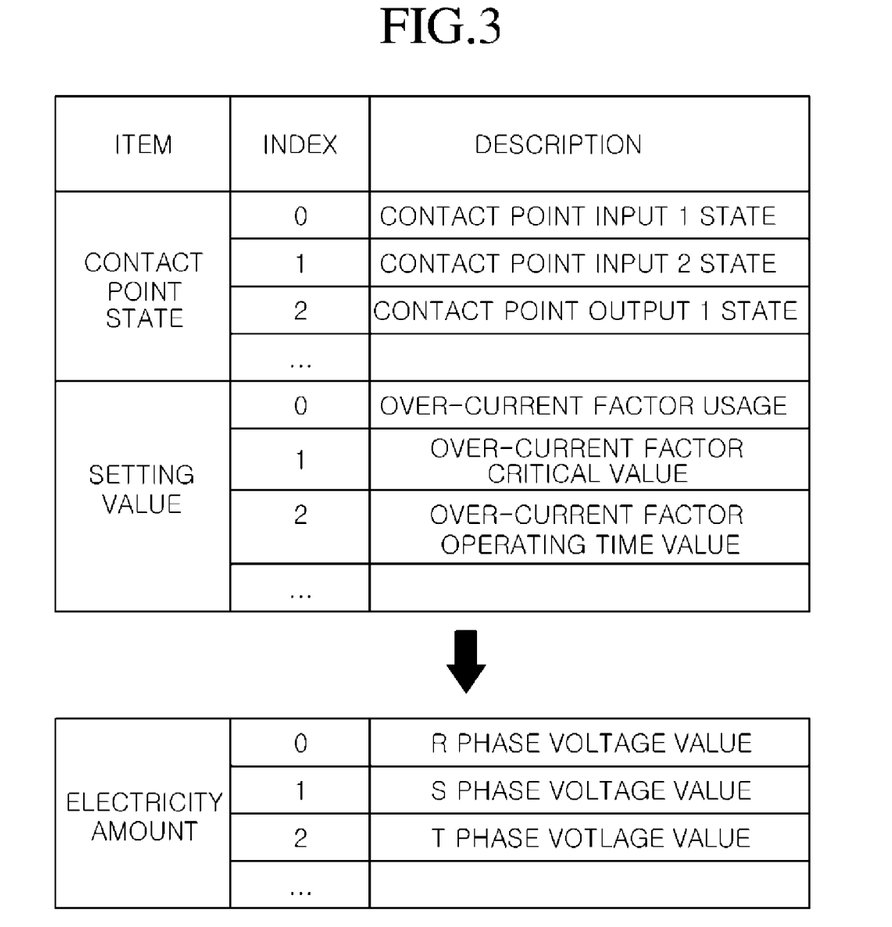
FIG. 3 is a table representing a point list of monitoring data according to an example embodiment of the present invention.

FIG. 3 is a table representing a point list of monitoring data according to an example embodiment of the present invention.

Referring to FIG. 3, the monitoring data may include contact point state data, setting value data, and electricity amount data, for example. Additionally, each of contact point state data, setting data, and electricity amount data may include an item and an index. The monitoring data of FIG. 3 according to an example embodiment of the present invention may vary according to the definition and types of the monitoring data and user setting.

Additionally, according to an example embodiment of the present invention, when a change on the monitoring data of a relay occurs, this may be defined as an event and may be processed as the monitoring data of a relay.

An event described in this specification may include a change on monitoring data having a high priority such as a change on an input contact point state of a relay, a change on an output contact point state, and a change on setting value data.

The contact point data may include data, which are transmitted to an input contact point and an output contact point of a relay.

The input contact point may be defined as a Local Operation Panel (LOP) selection input contact point, an ON input contact point for operating a motor, a reverse rotation input contact point, a STPO input contact point, a reset input contact point, a Flow Switch (F-S) mode selection input contact point, a COM1, COM2, external TRIP input contact point, a delta start input contact point, and a y start input contact point.

The input contact point may correspond to a terminal number. The definition of the input contact point and correspondence between terminal numbers may vary according to a circuit configuration of a motor control device itself and a connection state of an external device.

In relation to monitoring data according to an example embodiment of the present invention, contact point state data may represent information inputted from an input contact point.

An output contact point may include at least one output contact point defined as a start output contact point such as delta start or y start. The start output contact point may output a control signal according to each start method. Additionally, an output contact point may include a contact point defined as a state contact point such as an LOP state output contact point and an AUTO state output contact point, which displays state information on a motor according to an operation mode. The state contact point may output a control signal for controlling the display unit 160 in order to display a motor state according to each operation mode.

When an event for data inputted from an input contact point or an output contact point occurs, a relay according to an example embodiment of the present invention may detect and store the data as monitoring data.

In more detail, when a signal is transmitted from an input/output contact point, this is detected as an event, and is classified with an input contact point state and an output contact point state. Then, as shown in FIG. 3, an index may be assigned to one point of a point list of monitoring data and stored.

Setting value monitoring data may include an operation mode that a user sets and a value according thereto. For example, when a user sets 'over-current mode' as 'use', a 'true' value may be stored in a '0' index of setting value monitoring data.

A user may set 'over-current factor critical value' and 'over-current factor operation time', which are determined as 'over-current'. A relay stores setting value data in a point list of monitoring data, and when a user changes a specific setting value, this is detected as an event in order to update a corresponding point list.

Moreover, contact point state monitoring data and setting value monitoring data may be monitoring data detected as an event. Event oriented monitoring data may be data that may be non-periodically set or changed according to user setting in a relay and a device connected thereto, not data detected during a predetermined period. The above event oriented monitoring data may not be monitored periodically in the relay 100, and then, may be detected as an event and stored in a point list.

Electricity amount data may include data about each phase voltage, current, and driving frequency in the case of a three phase motor. Electricity amount data may be monitored periodically unlike the event oriented data such as contact point state and setting value data. Accordingly, non-event oriented data may be described as data used for relatively predicting a change of its value. The non-event oriented data may be defined as monitoring data in addition to the event oriented monitoring data. A relay may detect and store electricity amount data observed periodically by setting electricity amount data as monitoring data.

Figure 4:
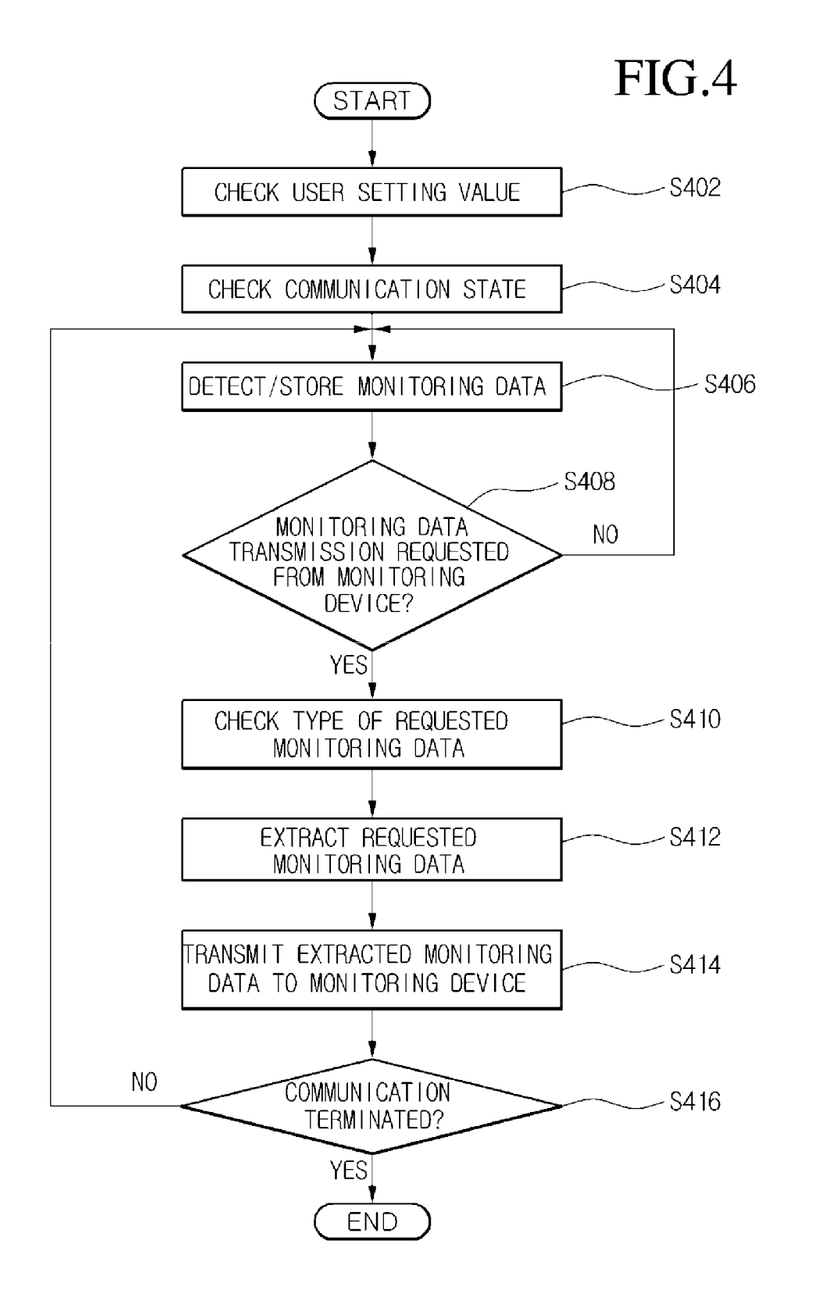
FIG. 4 is a data processing flowchart according to an example embodiment of the present invention.

FIG. 4 is a data processing flowchart according to an example embodiment of the present invention. A monitoring data processing operation shown in FIG. 4 represents an initial operation of a relay, for example, an operation when a relay is turned on or is reset.

Referring to FIG. 4, the control unit 150 confirms first setting value data received from a user whose information is pre-stored in the storage unit 130 in operation S402. User setting value data are data that are not frequently changed, and according to its value, it is determined whether event oriented data such as contact point state monitoring data are detected.

The control unit 150 may confirm a communication state with respect to a monitoring device in operation S404. That is, communication is connected between the relay and the monitoring device, and after this is confirmed, data transmission becomes possible therebetween.

The control unit 150 may control the detection unit 120 to detect monitoring data. The detection unit 120 may detect event oriented monitoring data first in operation S406.

An operation for detecting and storing the event oriented monitoring data will be described with reference to FIG. 5.

Figure 5:
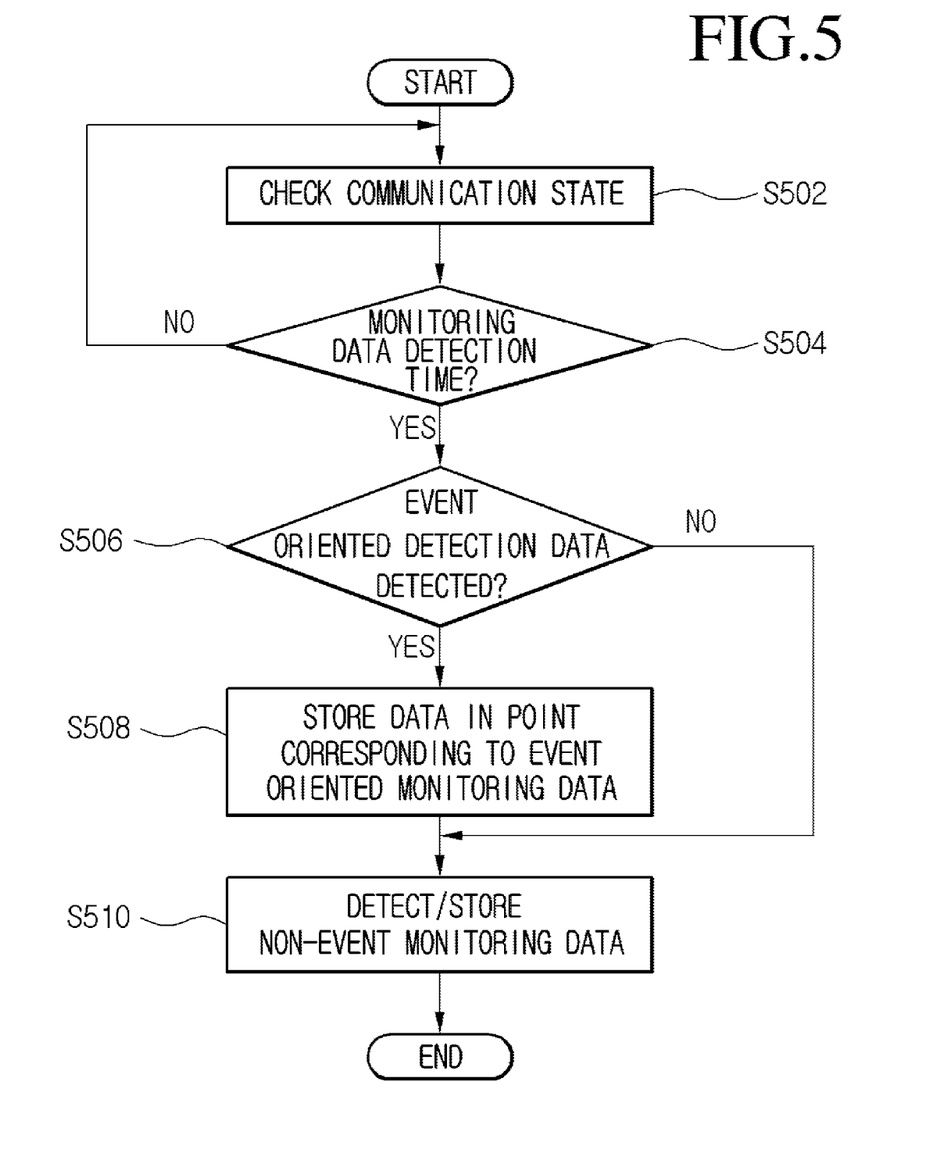
FIG. 5 is a data processing flowchart according to an example embodiment of the present invention.

FIG. 5 is a monitoring data collecting flowchart according to an example embodiment of the present invention. FIG. 5 illustrates that the relay 100 performs an operation for detecting and storing monitoring data on the basis of an event.

Referring to FIG. 5, the control unit 150 of the relay 100 confirms whether the communication unit 140 has a normal communication connection state with respect to the monitoring device 200.

If the communication connection state with respect to the monitoring device 200 is normal, the control unit 150 may determine the detection time of the monitoring data in operation S504. That is, the control unit 150 may perform a detection operation at the detection time of the monitoring data periodically or in real time. According to an example embodiment of the present invention, the case that detection is periodically made at a predetermined time will be described as one example.

When the detection time of the monitoring data is confirmed on the basis of the determination result, the control unit 150 may determine whether an event oriented monitoring data are detected in operation S506. If the event oriented monitoring data are not detected, according to a predetermined rule, a non-event oriented monitoring data may be detected and stored in operation S510.

On the contrary, when the event oriented monitoring data are detected, the control unit 150 may store the detected monitoring data in a corresponding point of a point list defined by a DNP method in operation S508.

For example, when contact point state data are detected from the event oriented monitoring data, a detected value may be stored in a contact point state point of a point list. Additionally, when setting value data are detected, a detected value may be stored in a corresponding point of a point list. That is, by detecting and storing monitoring data on the basis of an event, a large amount of data may be efficiently stored and managed. Additionally, by storing monitoring data on the basis of an event, when a data transmission request made from the monitoring device 200, a corresponding point may be immediately transmitted. Thus, data transmission is also effective.

Accordingly, the monitoring data stored in the above manner may be read according to whether a signal for requesting the monitoring data is received from the monitoring device 200.

The control unit 150 may determine whether the transmission request signal of the monitoring data is received from the monitoring device 200 through the communication unit 140 in operation S408. The control unit 150 may check the request signal of the monitoring data from the monitoring device 200 periodically in order to detect it. Or, a transmission request may be checked in real time. Additionally, even if a signal for requesting the transmission of monitoring data is not received from the monitoring device 200, the detection unit 120 continuously detects and stores the monitoring data.

When it is detected that a signal for requesting monitoring data is received from the monitoring device 200, the control unit 150 may check the type of the requested monitoring data in operation S410. That is, the monitoring device 200 may request only event oriented monitoring data including setting value data or contact point state data, or only non-event oriented monitoring data. Additionally, the monitoring device 200 may request only monitoring data having a specific index value. For example, as shown in the table of FIG. 3, only the data for an input value of a contact point 2 corresponding to an index '1' among contact point state data may be requested. Accordingly, when a signal for requesting monitoring data is received from the monitoring device 200, the control unit 150 may extract only specific monitoring data that the monitoring device 200 requests and then may transmit them.

The control unit 150 may check the type of the requested monitoring data from the monitoring device 200, and may extract corresponding monitoring data in operation S412.

The control unit 150 may transmit the extracted monitoring data to the corresponding monitoring device 200 through the communication unit 140 in operation S414.

When a communication termination event occurs, the control unit 150 may terminate a communication connection state with respect to the connected monitoring device 200 in operation S416. That is, the control unit 150 determines whether a transmission operation of the monitoring data is terminated, and then, continuously detects and stores the monitoring data except the case that monitoring data cannot be transmitted due to the failure of the relay 100 itself.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A relay comprising:
    a detector that includes a contact point input unit and a contact point output unit, the detector configured to classify received monitoring data into event oriented monitoring data and non-event oriented monitoring data, to detect the event oriented monitoring data and to detect an event when a signal is transmitted from the contact point input unit and contact point output unit, the event oriented monitoring data associated with a change of a monitoring value of the relay and the non-event oriented monitoring data associated with data generated periodically for predicting a change of the monitoring value;
    a memory configured to store information;
    a transceiver configured to receive a request for monitoring data from a monitoring device and to transmit at least part of the monitoring data according to the request; and
    a controller configured to:
    detect setting value data from the received monitoring data;
    control the memory to store the detected event oriented monitoring data and the detected setting value data;
    confirm a communication state with respect to the monitoring device;
    assign an index to one point of a point list of monitoring data;
    store monitoring data based on the detected event; and
    control the transceiver to transmit a corresponding point when the request is received.

2. The relay according to claim 1, wherein the controller is further configured to:
    determine a type of the monitoring data requested by the received request;
    extract data corresponding to the determined type from the memory; and
    transmit the extracted data.

3. The relay according to claim 1, wherein the controller is further configured to store the detected setting value data and the detected event oriented monitoring data in a corresponding point in a point list defined by Distributed Network Protocol (DNP).

4. The relay according to claim 1, wherein:
    the request requests at least the event oriented monitoring data or monitoring data of a specific index; and
    the controller is further configured to check the request and transmit corresponding monitoring data to the monitoring device.

5. A method of processing monitoring data in a relay, the method comprising:
    classifying event oriented monitoring data and non-event oriented monitoring data from received monitoring data;
    detecting the event oriented monitoring data first;
    storing the detected event oriented monitoring data in a corresponding point of a point list defined when the event oriented monitoring data is detected;
    receiving a request from a monitoring device for monitoring data; and
    transmitting a point corresponding to the requested monitoring data,
    wherein the event oriented monitoring data is associated with a change of a monitoring value of the relay and the non-event oriented monitoring data is associated with data generated periodically for predicting a change of the monitoring value, and
    wherein the event oriented monitoring data comprises data associated with a change of a state of an input contact point of the relay or an output contact point of the relay.

6. The method according to claim 5, further comprising storing detected setting value data and the detected event oriented monitoring data in the corresponding point of the point list that is defined by Distributed Network Protocol (DNP).

7. The method according to claim 5, further comprising transmitting monitoring data in response to the received request, wherein the request requests at least the event oriented monitoring data or monitoring data of a specific index.

8. The method according to claim 5, further comprising:
    determining a type of the monitoring data requested by the received request; and
    transmitting corresponding monitoring data to the monitoring device according to the determined type.

* * * * *